United States Patent
Arai et al.

(10) Patent No.: US 10,523,029 B2
(45) Date of Patent: Dec. 31, 2019

(54) POWER STORAGE SYSTEM AND CHARGING METHOD FOR SECONDARY BATTERY

(71) Applicant: MURATA MANUFACTURING CO., LTD, Kyoto (JP)

(72) Inventors: Narumi Arai, Kanagawa (JP); Kentaro Marutani, Kanagawa (JP); Kenji Kobayashi, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 122 days.

(21) Appl. No.: 15/037,023

(22) PCT Filed: Sep. 30, 2014

(86) PCT No.: PCT/JP2014/004988
§ 371 (c)(1),
(2) Date: May 16, 2016

(87) PCT Pub. No.: WO2015/075857
PCT Pub. Date: May 28, 2015

(65) Prior Publication Data
US 2016/0254680 A1   Sep. 1, 2016

(30) Foreign Application Priority Data

Nov. 25, 2013   (JP) ................. 2013-243287

(51) Int. Cl.
*H02J 7/00* (2006.01)
*H01M 10/44* (2006.01)
*H01M 10/48* (2006.01)

(52) U.S. Cl.
CPC ............. *H02J 7/007* (2013.01); *H01M 10/44* (2013.01); *H01M 10/443* (2013.01);
(Continued)

(58) Field of Classification Search
CPC ....................................................... H02J 7/007
(Continued)

(56) References Cited

U.S. PATENT DOCUMENTS 6,747,457 B2 * 6/2004 Suzuki ................ B60L 11/1851
324/433
7,663,339 B2 * 2/2010 Kimura ................. H01M 10/42
320/107
(Continued)

FOREIGN PATENT DOCUMENTS

EP           2131440          9/2009
EP           2403048 A2 *     6/2011  ............ H01M 10/48
(Continued)

OTHER PUBLICATIONS

International Search Report prepared by the Japanese Patent Office dated Nov. 12, 2014, for International Application No. PCT/JP2014/004988.

(Continued)

*Primary Examiner* — Jerry D Robbins
(74) *Attorney, Agent, or Firm* — Sheridan Ross PC (57) ABSTRACT

A power storage system according to the present technology includes: a parameter detector that detects a parameter of a secondary battery; a table storage unit that stores a table indicating a correspondence between a parameter of the secondary battery and a charging condition; and a charging control unit configured to refer to, based on the detected parameter, a corresponding charging condition from the table and make control to charge the secondary battery in this charging condition.

9 Claims, 7 Drawing Sheets

(52) U.S. Cl.
CPC ......... *H01M 10/48* (2013.01); *H01M 10/486* (2013.01); *H02J 7/0042* (2013.01); *H02J 7/0091* (2013.01); *H02J 2007/0096* (2013.01); *Y02B 40/90* (2013.01); *Y02E 70/40* (2013.01)

(58) Field of Classification Search
USPC .......................................................... 320/107
See application file for complete search history.

(56) References Cited

U.S. PATENT DOCUMENTS

| | | | | |
|---|---|---|---|---|
| 2010/0079111 | A1* | 4/2010 | Masuda | H01M 10/486 320/134 |
| 2010/0156356 | A1* | 6/2010 | Asakura | H01M 10/44 320/148 |
| 2010/0185405 | A1* | 7/2010 | Aoshima | B60L 3/0046 702/63 |
| 2011/0127958 | A1* | 6/2011 | Ishishita | B60L 11/1862 320/109 |
| 2011/0187329 | A1* | 8/2011 | Majima | H01M 10/48 320/149 |
| 2012/0112700 | A1* | 5/2012 | Morimoto | H01M 10/48 320/132 |
| 2012/0166031 | A1* | 6/2012 | Nishida | H02J 7/0026 701/22 |
| 2012/0256569 | A1 | 10/2012 | Kawahara et al. | |
| 2012/0310566 | A1* | 12/2012 | Hoshino | G01R 31/3651 702/63 |
| 2013/0030739 | A1* | 1/2013 | Takahashi | G01R 31/3658 702/63 |
| 2013/0038333 | A1* | 2/2013 | Harada | G01R 31/3679 324/431 |
| 2014/0095092 | A1* | 4/2014 | Ikeda | G01R 31/3606 702/63 |

FOREIGN PATENT DOCUMENTS

| | | |
|---|---|---|
| EP | 2403048 | 4/2012 |
| JP | 3104747 | 10/2004 |
| JP | 2007-195312 | 8/2007 |
| JP | 2010-057251 | 3/2010 |

OTHER PUBLICATIONS

Official Action for European Patent Application No. 14863552.7-1202, dated Jun. 11, 2018, 4 pages.

* cited by examiner

FIG.1

| Resistance / Temperature | 20mΩ | 30mΩ | 40mΩ | 50mΩ | ... |
|---|---|---|---|---|---|
| 20°C | 1.0C | 0.8C | 0.7C | 0.7C | ... |
| 10°C | 0.8C | 0.6C | 0.4C | 0.3C | ... |
| 0°C | 0.5C | 0.3C | 0.1C | Use inhibition | ... |
| −5°C | 0.3C | 0.1C | Use inhibition | Use inhibition | ... |
| ⋮ | ⋮ | ⋮ | ⋮ | ⋮ | |

| Resistance / Temperature | 20mΩ | 30mΩ | 40mΩ | 50mΩ | ... |
|---|---|---|---|---|---|
| 20°C | 0.9C | 0.72C | 0.63C | 0.63C | ... |
| 10°C | 0.72C | 0.54C | 0.36C | 0.27C | ... |
| 0°C | 0.45C | 0.27C | 0.09C Use inhibition | Use inhibition | ... |
| −5°C | 0.27C | 0.09C Use inhibition | Use inhibition | Use inhibition | ... |
| ⋮ | ⋮ | ⋮ | ⋮ | ⋮ | |

FIG.7

Example in which $Q(t_{n}-1)-Q(t_n) > Q_{ref}(t_{n}-1) - Q_{ref}(t_n)$ is not established

POWER STORAGE SYSTEM AND CHARGING METHOD FOR SECONDARY BATTERY

CROSS REFERENCE TO RELATED APPLICATIONS

This application is a national stage application under 35 U.S.C. 371 and claims the benefit of PCT Application No. PCT/JP2014/004988 having an international filing date of 30 Sep. 2014, which designated the United States, which PCT application claimed the benefit of Japanese Patent Application No. 2013-243287 filed 25 Nov. 2013, the disclosures of which are incorporated herein by reference in their entirety.

TECHNICAL FIELD

The present technology relates to a power storage system that performs power storage using a secondary battery such as a lithium-ion battery and to a charging method for a secondary battery.

BACKGROUND ART

Currently, secondary batteries represented by lithium-ion batteries or the like are widely used as power supplies for various mobile devices such as a mobile phone. In recent years, there is a great market demand to increase the capacity of power storage batteries for onboard use in electric automobiles and hybrid vehicles, large-size power storage use of back up power supplies of mobile phone base stations and the like, and middle-size power storage use of household back up power supplies, for example. Accordingly, it is expected that the opportunity to constantly use the secondary battery outdoors will increase. Therefore, there is a growing tendency to consider the temperature characteristics of the secondary battery as important.

In particular, at a low temperature, the characteristics of the lithium-ion battery are lowered and the deterioration progresses rapidly. The deterioration of the secondary battery is classified into a plurality of modes depending on conditions. For example, a lithium-ion battery is slowly deteriorated at a temperature equal to or higher than a room temperature (e.g., 15 C.° or more) and rapidly deteriorated due to precipitation of metal lithium at a temperature lower than the room temperature.

As a publicly known technique for monitoring the deterioration state of the secondary battery, for example, there is known a technique for estimating an amount of deterioration based on a square root of time, a temperature, and a state of charge (SOC) (e.g., Patent Document 1). Such a technique is configured to estimate a slow deterioration state at a temperature equal to or higher than a room temperature.

Patent Document 1: Japanese Patent Application Laid-open No. 2007-195312

SUMMARY OF INVENTION

Problem to be Solved by the Invention

The deterioration mode of the lithium-ion battery at least includes slow deterioration at a temperature equal to or higher than a room temperature (e.g., 15 C.° or more) and rapid deterioration due to precipitation of metal lithium at a temperature lower than the room temperature. The rapid deterioration due to precipitation of metal lithium at the temperature lower than the room temperature largely influences the lifetime of the lithium-ion battery. The rapid deterioration at a temperature lower than the room temperature can be suppressed by some degree by reducing a charging current.

However, if the charging current is reduced, a longer charging time is correspondingly required, which impairs the convenience for an end user. If the charging current is increased for shortening the charging time, the rapid deterioration due to precipitation of metal lithium at a temperature lower than the room temperature becomes more significant with the result that the lifetime is shortened.

As described above, in the secondary battery such as a lithium-ion battery, there is a problem in that it is difficult to select a charging condition such as an optimal charging current.

In view of this, it is an object of the present technology to provide a power storage system capable of charging a secondary battery in an optimal charging condition and a charging method for a secondary battery.

Means for Solving the Problem

In order to solve the above-mentioned problem, a power storage system according to an aspect of the present technology includes: a parameter detector that detects a parameter of a secondary battery; a table storage unit that stores a table indicating a correspondence between a parameter of the secondary battery and a charging condition; and a charging control unit configured to refer to, based on the detected parameter, a corresponding charging condition from the table and make control to charge the secondary battery in this charging condition.

The table may be a table showing a correspondence between a combination of the temperature of the secondary battery with an internal resistance and a charging condition.

The charging condition may be defined to ensure a predetermined use period of the secondary battery.

The charging control unit may be configured to refer to the corresponding charging condition from the table and perform charging in this charging condition if the detected temperature is lower than a predetermined temperature, and to perform charging in a fixed charging condition if the detected temperature is equal to or higher than the predetermined temperature.

This power storage system further includes: an amount-of-deterioration calculator that calculates an amount of deterioration of the secondary battery; and an allowable amount-of-deterioration calculator that calculates an allowable amount of deterioration of the secondary battery, in which the charging control unit may be configured to compare the calculated amount of deterioration with the calculated allowable amount of deterioration and to update the charging condition of the table such that the deterioration speed of the secondary battery is suppressed according to a result thereof.

The amount-of-deterioration calculator and the allowable amount-of-deterioration calculator may calculate the amount of deterioration and the allowable amount of deterioration, respectively, according to a predetermined timing condition, and the charging control unit may be configured to update, if a change value of the amount of deterioration that is next acquired with respect to the amount of deterioration at a point of time at which the charging condition of the table was updated is larger than a change value of the allowable amount of deterioration that is next acquired with respect to the allowable amount of deterioration at the point of time at which the charging condition of the table was updated, the charging condition of the table such that a deterioration speed of the secondary battery is reduced.

A charging method for a secondary battery according to another aspect of the present technology includes: detecting a parameter of the secondary battery; referring to a corresponding charging condition from a table showing a correspondence between the parameter of the secondary battery and the charging condition based on the detected parameter; and charging the secondary battery in this charging condition.

Effects of the Invention

As described above, according to the present technology, it is possible to charge the secondary battery in the optimal charging condition.

MODE(S) FOR CARRYING OUT THE INVENTION

Hereinafter, an embodiment of the present technology will be referred with reference to the drawings.

First Embodiment

Figure 1:
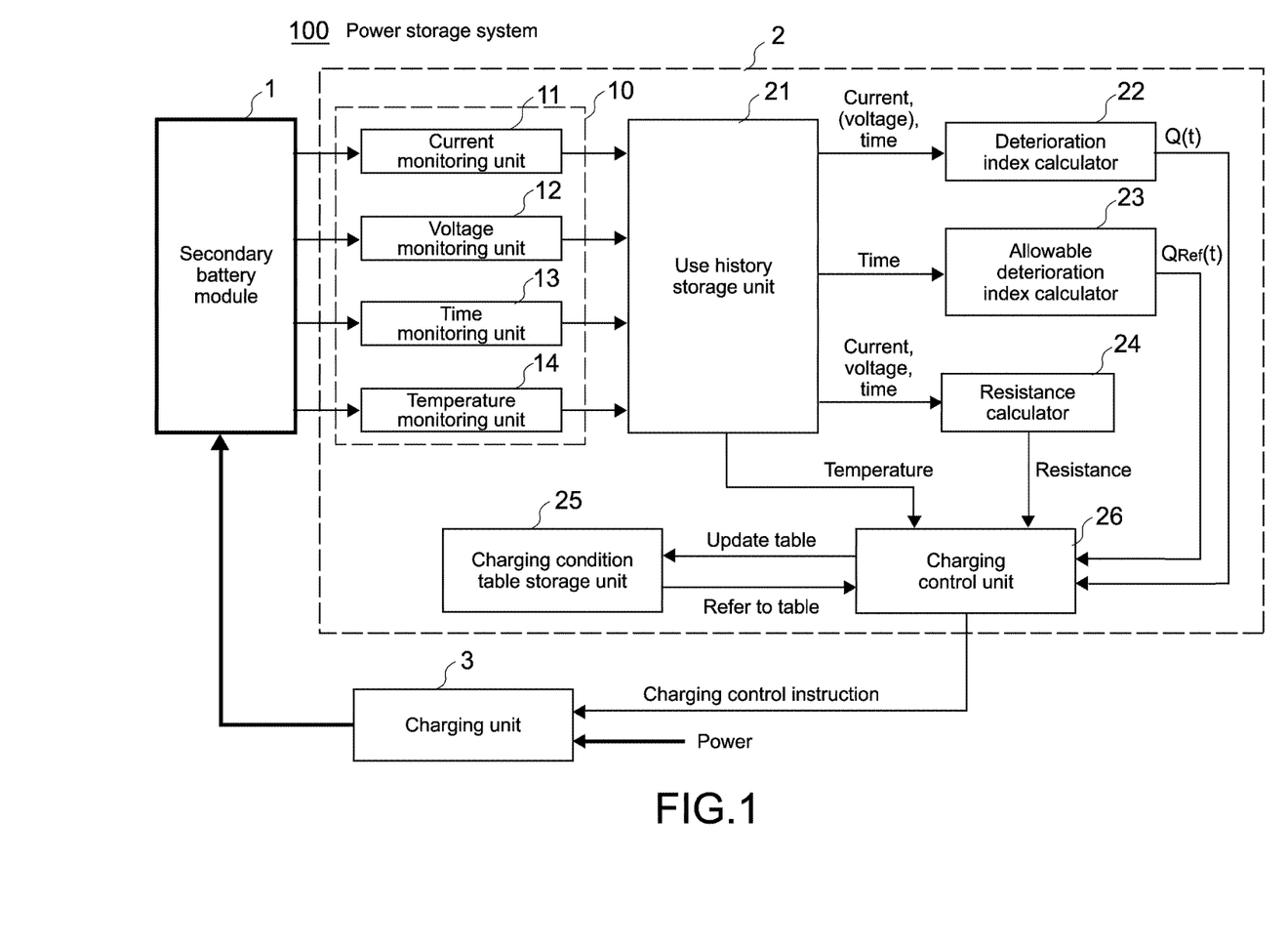
FIG. 1 A block diagram showing a configuration of a power storage system that is a first embodiment according to the present technology.

FIG. 1 is a block diagram showing a configuration of a power storage system that is a first embodiment according to the present technology.

The power storage system 100 includes a secondary battery module 1, a charging control apparatus 2, and a charging unit 3.

The secondary battery module 1 is, for example, formed of a secondary battery such as a lithium-ion battery.

The charging control apparatus 2 is an apparatus that controls the charging unit 3.

The charging unit 3 is formed of a circuit or the like for generating, from a power obtained from an apparatus or the like that converts a commercial power supply or solar energy into a power, a power for charging the secondary battery, and supplying it into the secondary battery.

The charging control apparatus 2 includes a deterioration parameter acquisition unit 10 that acquires values of a plurality of deterioration parameters necessary to determine an amount of deterioration or the like of the secondary battery in the secondary battery module 1.

The deterioration parameter acquisition unit 10 includes a current monitoring unit 11 that monitors a current flowing through the secondary battery during charging by the use of a current sensor or the like, a voltage monitoring unit 12 that monitors a voltage across terminals of the secondary battery during charging by the use of a voltage sensor or the like, a time monitoring unit 13 that monitors a total operating time of the secondary battery by the use of a timer or the like, and a temperature monitoring unit 14 that captures and monitors information on the temperature of the secondary battery from a temperature sensor or the like in the secondary battery module 1. That is, the deterioration parameter acquisition unit 10 acquires a current flowing through the secondary battery during charging, a voltage across the terminals of the secondary battery during charging, a total operating time of the secondary battery, and a temperature of the secondary battery as the values of the deterioration parameters.

The charging control apparatus 2 further includes a use history storage unit 21, a deterioration index calculator 22, an allowable deterioration index calculator 23, a resistance calculator 24, a charging condition table storage unit 25, and a charging control unit 26. Here, the use history storage unit 21 and the charging condition table storage unit 25 are storage units provided using a memory device such as a RAM (Random Access Memory) (not shown) in the charging control apparatus 2.

The deterioration index calculator 22, the allowable deterioration index calculator 23, the resistance calculator 24, and the charging control unit 26 are functional units provided as a controller such as a CPU (Central Processing Unit), a program, and the like in the charging control apparatus 2.

The use history storage unit 21 is an area for storing the values of the deterioration parameters such as a current, a voltage, a total operating time, and a temperature that are acquired by the deterioration parameter acquisition unit 10 as a use history of the secondary battery.

Figure 2:
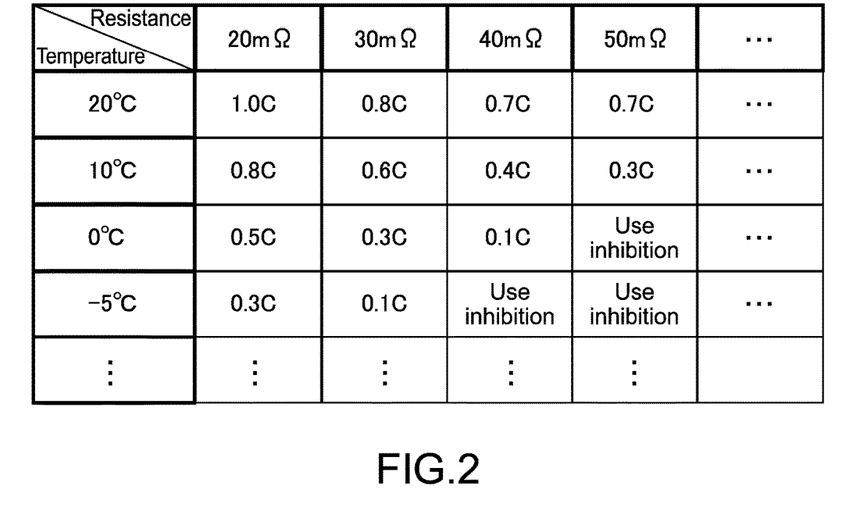
FIG. 2 A diagram showing an example of a table showing a correspondence between a combination of a temperature of a secondary battery with an internal resistance and a charging condition.

The charging condition table storage unit 25 is, for example, as shown in FIG. 2, an area in which a table showing the correspondence between the combination of the temperature of the secondary battery with the internal resistance and the charging condition is stored. The internal resistance of the secondary battery is gradually increased due to deterioration of the secondary battery. Therefore, by combining it with the temperature of the secondary battery, it becomes possible to select the charging condition at a higher resolution.

In this embodiment, the charging condition is provided as a charging current. At a temperature lower than a room temperature, as the charging current is lowered, the deterioration speed of the secondary battery can be suppressed. However, as the charging current is lowered, a longer charging time is required. In view of this, in order to make the charging time as short as possible in such a range that a use period of the secondary battery required by a maker or the like can be ensured, information indicating an optimal charging current with respect to a combination of values of the temperature and the internal resistance of the secondary battery is set in the table.

Note that, in the table shown in FIG. 2, the temperature 20 C.° indicates a range of 15 C.° or more and less than 25 C°. The temperature 10 C.° indicates a range of 5 C.° or more and less than 15 C°. The temperature 0 C.° indicates a range of −0.25 C.° or more and less than 5 C°. The temperature −5 C.° indicates a range of −xC° or more and less than −0.25 C°. Furthermore, the resistance value 20 mΩ indicates 25 mΩ or less. The resistance value 30 mΩ indicates 25 mΩ or more and less than 35 mΩ. The resistance value 40 mΩ indicates 35 mΩ or more and less than 45 mΩ. The resistance value 50 mΩ indicates 45 mΩ or more and less than 55 mΩ.

The temperature, the resolution of the internal resistance, and the information indicating a charging current that are shown in the table are examples. In some combinations of the values of the temperature and the internal resistance, a case where charging itself is impossible is assumed. With respect to such combinations, information indicating charging inhibition is set.

Based on the values of the deterioration parameters such as current, voltage, and total operating time that are stored in the use history storage unit 21, the deterioration index calculator 22 calculates a deterioration index value $Q(t_n)$ indicating an amount of deterioration of the secondary battery at the current point of time (point of time of total operating time $t_n$).

The allowable deterioration index calculator 23 determines an allowable deterioration index value $Q_{Ref}(t_n)$ corresponding to the total operating time $t_n$ of the secondary battery that is used as the evaluation reference value of the deterioration index value $Q(t_n)$ at a point of time of the total operating time $t_n$ that is calculated by the deterioration index calculator 22.

Figure 3:
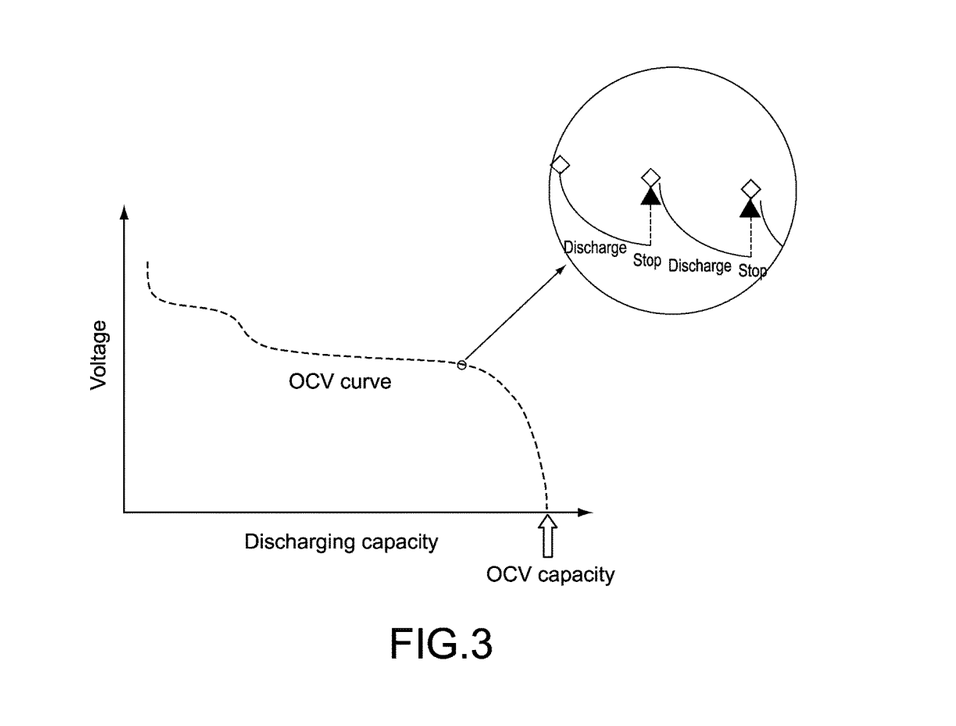
FIG. 3 A diagram describing an OCV capacity.

There are various types of deterioration index of the secondary battery. One of them is, for example, an OCV (Open Circuit Voltage) capacity. The OCV capacity is originally an integrated capacity when discharge and stop of the secondary battery are repeated from its fully charged state until it reaches a cut-off voltage as shown in FIG. 3.

It is assumed that a charging capacity calculated by, for example, multiplication of a charging current and a time after the secondary battery is completely discharged at a low current until the fully charged state is obtained is approximately equal to the above-mentioned OCV capacity. It is thus possible to adopt this as the deterioration index of the secondary battery.

Figure 4:
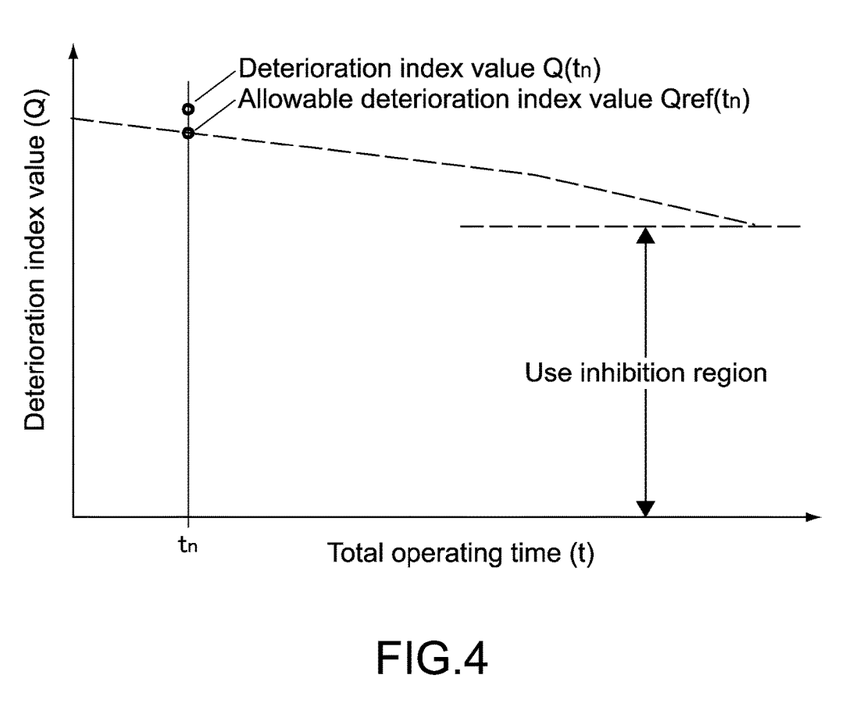
FIG. 4 A graph showing a relationship between a total operating time $t_n$ and an allowable deterioration index value $Q_{Ref}(t_n)$ of the secondary battery.

FIG. 4 is a graph showing a relationship between the allowable deterioration index value $Q_{Ref}(t_n)$ and the total operating time $t_n$ of the secondary battery in the case where the above-mentioned OCV capacity is adopted as the deterioration index value $Q(t_n)$. Information indicating this relationship is stored in the allowable deterioration index calculator 23 in advance. The allowable deterioration index calculator 23 determines, based on this information, the allowable deterioration index value $Q_{Ref}(t_n)$ at the point of time of the total operating time $t_n$.

The resistance calculator 24 statistically calculates an internal resistance corresponding to the deterioration state of the secondary battery by the use of the values of the deterioration parameters such as current, voltage, and time stored in the use history storage unit 21, to which a measurement time corresponds, and stores that value.

Note that, in this embodiment, the deterioration parameter acquisition unit 10 and the resistance calculator 24 correspond to a "parameter detector" in the scope of claims.

The charging control unit 26 is a controller that controls charging of the secondary battery. When a predetermined timing condition is established, the charging control unit 26 refers to the value of the parameter of the temperature stored in the use history storage unit 21 and acquires the value of the internal resistance of the secondary battery stored in the resistance calculator 24. The charging control unit 26 refers to the charging condition corresponding to the combination of the temperature with the internal resistance and sets it inside the charging control unit 26.

The charging control unit 26 compares the deterioration index value $Q(t_n)$ at the point of time of the total operating time $t_n$ that is calculated by the deterioration index calculator 22 with the allowable deterioration index value $Q_{Ref}(t_n)$ at the point of time of the total operating time $t_n$ that is calculated by the allowable deterioration index calculator 23, to thereby evaluate the deterioration state of the secondary battery.

If $Q(t_n) > Q_{Ref}(t_n)$ is not established, that is, if the deterioration index value $Q(t_n)$ is equal to or smaller than the allowable deterioration index value $Q_{Ref}(t_n)$, it is determined that the amount of deterioration of the secondary battery is in such a range that a use period required by a maker or the like cannot be ensured. In this case, the charging control unit 26 updates the charging condition of the table such that the deterioration speed of the secondary battery is suppressed.

Furthermore, if an amount of change (amount of decrease) of a next calculated deterioration index value $Q(t_n)$ with respect to the deterioration index value $Q(t_{n-1})$ at the point of time at which the charging condition of the table was updated is larger than a change value (amount of decrease) of a next calculated allowable deterioration index value $Q_{Ref}(t_n)$ with respect to the allowable deterioration index value $Q_{Ref}(t_{n-1})$ also at the point of time at which the charging condition of the table was updated, the charging control unit 26 is configured to update the charging condition of the table such that the deterioration speed of the secondary battery is reduced, again.

[Description of Operation]

Next, an operation of the charging control apparatus 2 of this embodiment will be described.

(1. Storage of Use History of Secondary Battery and Value of Internal Resistance The deterioration parameter acquisition unit 10 acquires, during charging of the secondary battery module 1, values of deterioration parameters of current, voltage, total operating time, and temperature. The deterioration parameter acquisition unit 10 may acquire, for example, during charging of the secondary battery module 1, the values of the deterioration parameters at the same or approximately the same timing one or more times.

The acquired values of the deterioration parameters are stored as a use history in the use history storage unit 21. If, during charging, the values of the deterioration parameters are acquired a plurality of times and stored in the use history storage unit 21, an average value of those values may be used for calculating internal resistance, deterioration index value, and the like.

Furthermore, the resistance calculator 24 refers to, according to a predetermined timing condition, the values of the deterioration parameters of the current, voltage, time, and the like from the use history storage unit 21, calculates an internal resistance of the secondary battery or an average value thereof, and stores the result. Note that examples of a timing condition for calculating the internal resistance can include immediately after the end of charging.

(2. Selection of Charging Condition at Temperature Lower than Room Temperature)

Figure 5:
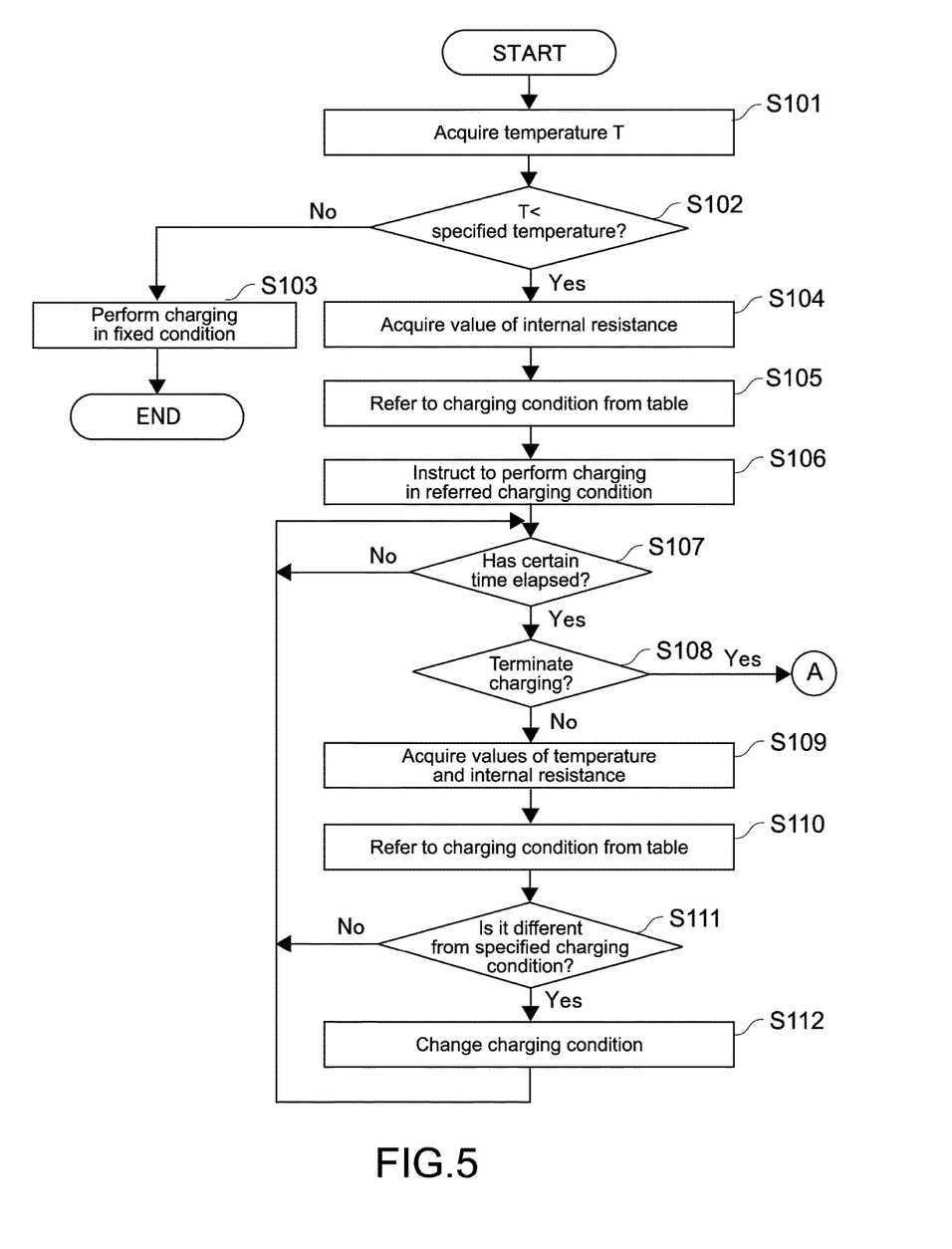
FIG. 5 A flowchart showing a flow of selection processing of a charging condition.

FIG. 5 is a flowchart showing a flow of selection processing of the charging condition.

First, the charging control unit 26 of the charging control apparatus 2 is provided with an instruction to start charging by, for example, a high-order controller. When receiving the instruction to start charging, the charging control unit 26 acquires the value of the deterioration parameter that is the temperature stored in the use history storage unit 21 (Step S101).

Next, the charging control unit 26 compares the acquired temperature with a predetermined specified temperature (Step S202). The specified temperature may be, for example, 25 C°. The present technology is not limited to this temperature as a matter of course.

Note that the charging control unit 26 may acquire, from the use history storage unit 21, values of the temperature at a plurality of points of time within a certain period and compare an average value of the values of the temperature with the specified temperature.

If the acquired temperature (or the average value) is equal to or higher than the specified temperature (No in Step S102), the charging control unit 26 considers that there is a low possibility that the rapid deterioration due to precipitation of metal lithium occurs, and issues a charging control instruction to the charging unit 3 to start charging of the secondary battery in a predetermined fixed charging condition (Step S103). Thus, the fixed charging condition used in an environment at a temperature equal to or higher than the specified temperature is set in advance other than the variable charging conditions managed by the table.

If the acquired temperature (or the average value) is lower than the specified temperature (Yes in Step S102), the charging control unit 26 proceeds to processing of referring to the table and selecting a charging condition. First, the charging control unit 26 acquires a value of the internal resistance of the secondary battery that is stored in the resistance calculator 24 (Step S104).

Next, the charging control unit 26 refers to a charging condition associated with a combination of the acquired value of the temperature with the value of the internal resistance, from the table (Step S105). For example, assuming the table shown in FIG. 2, if the temperature is 19 C° and the resistance value is 32 mΩ, 0.8 C is selected as the charging condition. Here, 1 C means a current value by which the secondary battery is discharged at a constant current and the discharging is completed one time.

The charging control unit 26 provides the charging unit 3 with the charging control instruction to start charging of the secondary battery in the charging condition referred from the table (Step S106). According to this charging control instruction, the charging unit 3 starts charging of the secondary battery in that charging condition.

Note that there is a case where, with respect to the combination of the temperature with the internal resistance, the information indicating the charging inhibition is referred from that table. In this case, the charging control unit 26 performs processing during charging inhibition, for example, the processing of supplying a control instruction for charging inhibition to the charging unit 3 and notifying the user of it. With this, it is possible to avoid occurrence of an accident or the like due to unexpected use of the secondary battery.

Also during charging of the secondary battery, the charging control unit 26 acquires, for example, in a predetermined certain time period (Step S107), the value of the temperature from the use history storage unit 21 and the value of the internal resistance from the resistance calculator 24 (Step S109).

The charging control unit 26 refers to the charging condition associated with the combination of the values of the acquired temperature and the internal resistance from the table (Step S110) and determines whether or not the referred charging condition is different from the charging condition already set in the charging unit 3 (Step S111).

If the charging condition referred from the table is the same as the charging condition already set in the charging unit 3 (No in Step S111), the charging control unit 26 returns to the processing of Step S107 of waiting for elapse of the certain time and repeats the same procedure.

If the newly referred charging condition is different from the already adopted charging condition (Yes in Step S111), the charging control unit 26 provides the charging unit 3 with a charging condition changing instruction to change to the newly referred charging condition (Step S112). The charging unit 3 changes the charging condition according to this charging condition changing instruction.

(3. Table Updating Processing According to Amount of Deterioration of Secondary Battery)

Figure 6:
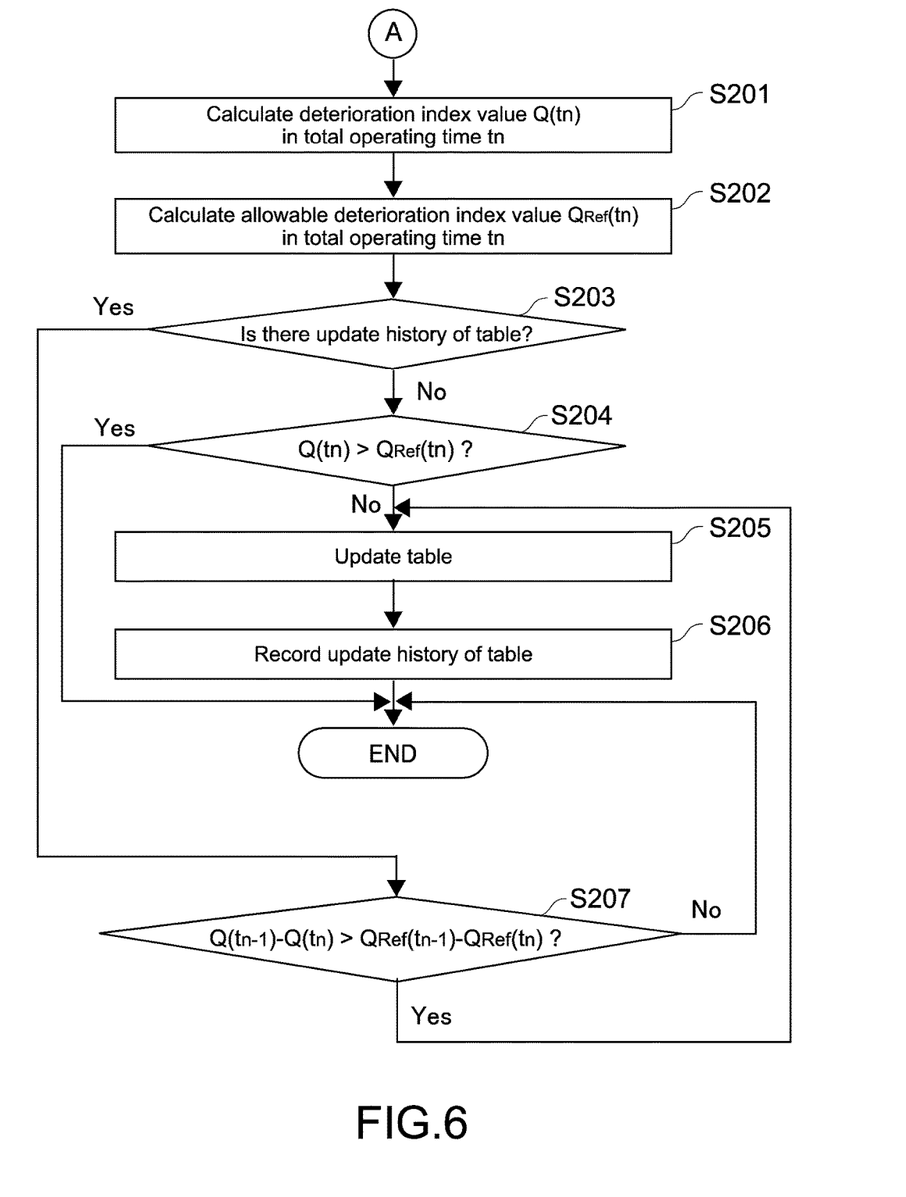
FIG. 6 A flowchart showing a flow of updating a table.

FIG. 6 is a flowchart showing a flow of table updating processing.

If charging of the secondary battery ends in Step S108 of FIG. 5 (Yes in Step S108), the charging control unit 26 activates the deterioration index calculator 22 and the allowable deterioration index calculator 23 for performing the table updating processing according to the amount of deterioration of the secondary battery.

The deterioration index calculator 22 refers to the values of the deterioration parameters of the current, voltage, total operating time, and the like that are stored in the use history storage unit 21 and calculates the deterioration index value $Q(t_n)$ of the secondary battery at the current point of time (point of time of the total operating time $t_n$) (Step S201).

Next, the allowable deterioration index calculator 23 calculates an allowable deterioration index value $Q_{Ref}(t_n)$ used as a reference value for evaluating the deterioration index value $Q(t_n)$ in the total operating time $t_n$ (Step S202).

After the allowable deterioration index value $Q_{Ref}(t_n)$ is calculated, the charging control unit 26 confirms a table update history (Step S203). The table update history includes information indicating whether or not the charging condition of the table has been updated, update date and time, and the like.

If it is confirmed that the charging condition of the table has not been updated (Yes in Step S203), the charging control unit 26 acquires the deterioration index value $Q(t_n)$ from the deterioration index calculator 22 and acquires the allowable deterioration index value $Q_{Ref}(t_n)$ from the allowable deterioration index calculator 23. The charging control unit 26 compares the deterioration index value $Q(t_n)$ with the allowable deterioration index value $Q_{Ref}(t_n)$ and determines whether or not the following condition is satisfied (Step S204).

$$Q(t_n) > Q_{Ref}(t_n) \qquad (1)$$

If the condition of Expression (1) above is satisfied (Yes in Step S204), the charging control unit 26 considers that the deterioration state of the secondary battery is at a level such that no problem occurs even if the current charging condition of the table is used as it is, in other words, at a level such that the use period of the secondary battery that is set by the maker or the like can be ensured, and terminates the processing. Note that the relationship between the deterioration index value $Q(t_n)$ and the allowable deterioration index value $Q_{Ref}(t_n)$ of FIG. 4 satisfies the condition of Expression (1) above.

If the condition of Expression (1) above is not satisfied (No in Step S204), the charging control unit 26 considers that the deterioration state of the secondary battery has a problem if the contents of the current table are used (there is a possibility that the use period of the secondary battery that is determined by the user cannot be ensured), and updates the charging condition of the table so as to increase the possibility that the use period of the secondary battery that is required by the maker or the like can be ensured (Step S205).

Figure 7:
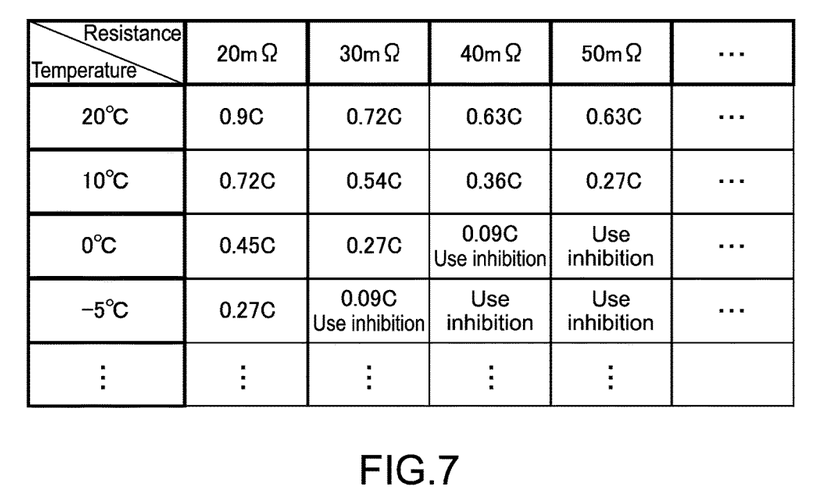
FIG. 7 A diagram showing an example of an update result of the table.

As a method of updating the charging condition of the table, for example, if the charging condition is a charging current, there is, for example, a method of multiplying the value of each charging current by a predetermined value below the decimal point. For example, the value of 0.9 is adopted as a fixed value below the decimal point. With this, the contents of the table are updated from the state shown in FIG. 2 to that of FIG. 7. Here, the use of the combination of the temperature with the resistance value by which the current value is smaller than 0.1 C may be inhibited.

After first update of the table is performed, the charging control unit 26 records the table update history (Step S206).

Next, a case where it is in Step S203 determined that the table has been updated will be described (Yes in Step S203). The charging control unit 26 determines whether or not the following condition is satisfied (Step S207).

$$Q(t_{n-1})-Q(t_n)>Q_{Ref}(t_{n-1})-Q_{Ref}(t_n) \qquad (2)$$

Where $Q(t_{n-1})$ denotes a deterioration index value calculated for the previous update of the table and $Q_{Ref}(t_{n-1})$ denotes an allowable deterioration index value calculated for the previous update of the table.

If the condition of Expression (2) above is not satisfied (No in Step S207), the charging control unit 26 considers that the deterioration speed of the secondary battery has no problem even if the current table is used as it is, that is, the deterioration speed of the secondary battery is at a level such that the use period of the secondary battery can be ensured, and terminates the processing.

Figure 8:
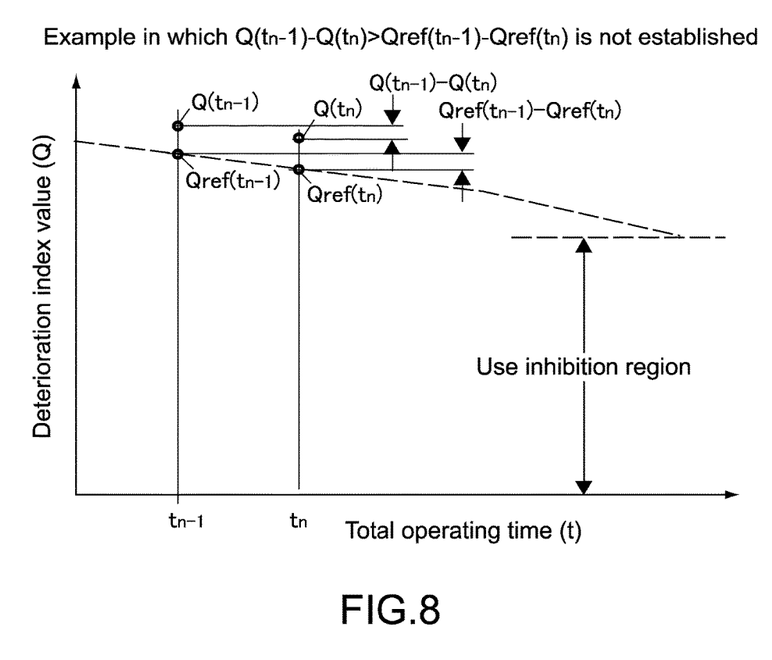
FIG. 8 A diagram showing a case where, in the determination as to whether or not second or subsequent update of the table is necessary, it is determined that the update is not necessary.

FIG. 8 shows an example in the case where the condition of Expression (2) is not satisfied. The amount of decrease $(Q(t_{n-1})-Q(t_n))$ of the deterioration index value is smaller than the amount of decrease $(Q_{Ref}(t_{n-1})-Q_{Ref}(t_n))$ of the allowable deterioration index value. Therefore, there is a low possibility that the deterioration index value $Q(t_n)$ may be lower than the allowable deterioration index value $Q_{Ref}(t_n)$ in the future. That is, by using the current table as it is, it is estimated that the use period of the secondary battery can be ensured.

If the condition of Expression (2) above is satisfied (Yes in Step S207), the charging control unit 26 considers that the deterioration speed of the secondary battery is at a level such that a problem occurs if the contents of the current table are used, in other words, at a level such that the use period of the secondary battery cannot be ensured, and updates the charging condition of the table such that there is a higher possibility that the use period of the secondary battery that is required by the maker or the like can be ensured (Step S205).

Figure 9:
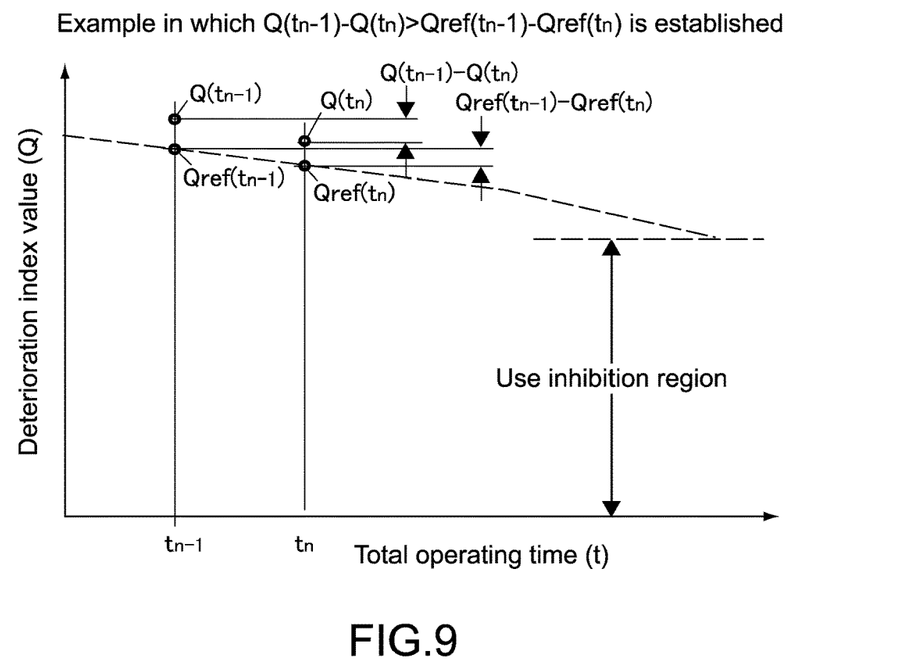
FIG. 9 A diagram showing a case where, in the determination as to whether or not second or subsequent update of the table is necessary, it is determined that the update is necessary.

FIG. 9 shows an example in the case where the condition of Expression (2) is not satisfied. The amount of decrease $(Q(t_{n-1})-Q(t_n))$ of the deterioration index value is larger than the amount of decrease $(Q_{Ref}(t_{n-1})-Q_{Ref}(t_n))$ of the allowable deterioration index value. Therefore, there is a possibility that the deterioration index value $Q(t_n)$ may be lower than the allowable deterioration index value $Q_{Ref}(t_n)$ in the future. That is, if the current table is used as it is, it is estimated that there is a possibility that the use period of the secondary battery cannot be ensured. Thus, in such a case, the table is updated such that there is a higher possibility that the use period of the secondary battery that is required by the maker or the like can be ensured.

In this case, as a method of updating the table, as in the first update, for example, if the charging condition is a charging current, a method of multiplying the value of each charging current by a predetermined value below the decimal point may be used. Alternatively, the charging condition of the table may be updated by a method different from that in the first update.

After the table is updated, the charging control unit 26 records the table update history again (Step S206).

Effects, Etc. of this Embodiment

1. In the power storage system 100 of this embodiment, with respect to various combinations of the temperature of the secondary battery with the internal resistance, the charging control apparatus 2 includes a table in which an ideal charging condition is registered in view of two perspectives of the reduction of the deterioration speed of the secondary battery at the temperature lower than the room temperature and the charging time. The charging control unit 26 refers to an ideal charging condition corresponding to the temperature of the secondary battery and the internal resistance at the current point of time from the table and makes a control to perform charging in this charging condition. With this, it is possible to charge the secondary battery in the optimal charging condition in view of two perspectives of the reduction of the deterioration speed of the secondary battery at the temperature lower than the room temperature and the charging time.

2. The charging control unit obtains an ideal charging condition from the table also during charging of the secondary battery and changes the charging condition depending on needs. That is, it is possible to operationally charge the secondary battery in an optimal charging condition depending on a change in situation.

3. The deterioration index calculator 22 quantifies the amount of deterioration of the secondary battery as the deterioration index value $Q(t_n)$ at the point of time of the total operating time $t_n$. If the deterioration index value $Q(t_n)$ at the point of time of the total operating time $t_n$ becomes equal to or smaller than the allowable deterioration index value $Q_{Ref}(t_n)$ at the point of time of the total operating time $t_n$, the charging control unit 26 determines that the deterioration state of the secondary battery is in such a range that the use period required by the maker or the like cannot be ensured, and updates the charging condition of the table such that the deterioration speed of the secondary battery at the temperature lower than the room temperature is reduced. With this, it is possible to charge the secondary battery in the optimal charging condition in view of three perspectives of the reduction of the deterioration speed of the secondary battery at the temperature lower than the room temperature, a charging time, and further a required use period.

4. In addition, if the amount of change (amount of decrease) of the deterioration index value $Q(t_n)$ next calculated with respect to the deterioration index value $Q(t_{n-1})$ at the point of time at which the charging condition of the table was updated is larger than the change value (amount of decrease) of the allowable deterioration index value $Q_{Ref}(t_n)$ next calculated also with respect to the allowable deterioration index value $Q_{Ref}(t_{n-1})$ at the point of time at which the charging condition of the table was updated, the charging control unit 26 updates the charging condition of the table such that the deterioration speed of the secondary battery is suppressed, again. Also with this, it is possible to charge the secondary battery in the optimal charging condition in view of three perspectives of the reduction of the deterioration speed of the secondary battery at the temperature lower than the room temperature, the charging time, and further the required use period.

Modified Example 1

In the above-mentioned embodiment, the charging condition is set as a charging current. However, there can be exemplified a cut-off current and a cut-off voltage when charging is terminated, as the charging condition that can be also used. Alternatively, a plurality of combinations of the charging current, the cut-off current, and the cut-off voltage may be set as the charging condition.

Modified Example 2

In this embodiment, the case where the secondary battery is the lithium-ion battery has been assumed. However, the present technology can also be applied to a case where other types of secondary batteries having a property that increases the deterioration speed in an environment at a temperature lower than a certain temperature such as a room temperature are assumed.

Modified Example 3

In the above-mentioned embodiment, it is assumed that the OCV capacity is adopted as the deterioration index of the secondary battery. However, the present technology is not limited thereto and it is possible to adopt other various indexes.

For example, it is possible to indicate the resistance value of the secondary battery. When the secondary battery is deteriorated, the resistance value gradually increases. In view of this, the charging control unit 26 compares a resistance value $R(t_n)$ of the secondary battery at the point of time of the total operating time $t_n$ with an allowable resistance value $R_{Ref}(t_n)$ of the secondary battery at the point of time of the total operating time $t_n$.

If $R(t_n) < R_{Ref}(t_n)$ is not established, the charging control unit 26 determines that the amount of deterioration of the secondary battery is in such a range that the use period required by the maker or the like cannot be ensured, and updates the charging condition of the table such that the deterioration speed of the secondary battery is suppressed.

The OCV capacity becomes smaller as deterioration of the secondary battery progresses. On the contrary, the resistance value of the secondary battery becomes larger as deterioration of the secondary battery progresses. Therefore, comparing the resistance value $R(t_n)$ of the secondary battery with the allowable resistance value $R_{Ref}(t_n)$ of the secondary battery, the magnitude relationship is reversed.

Furthermore, a "$t_1$-second resistance" may be used as a resistance value that is actually set as an evaluated target. The $t_1$-second resistance is as follows.

Figure 10:
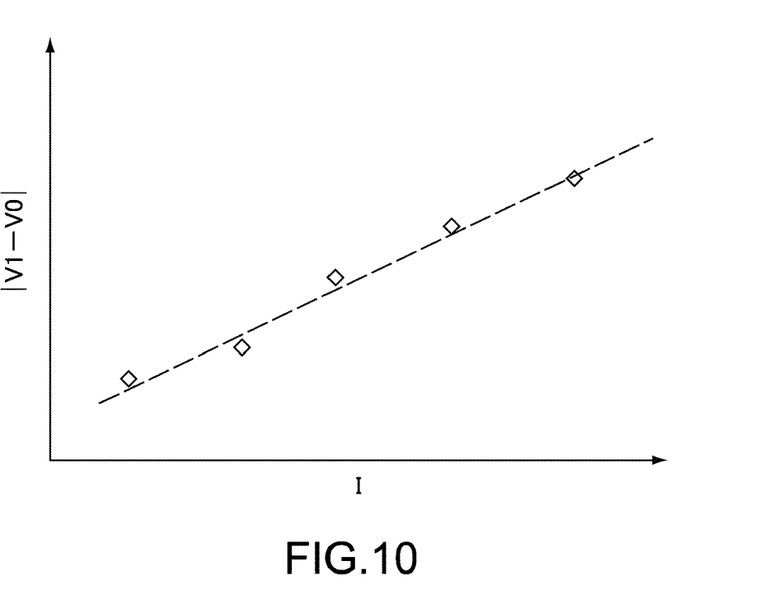
FIG. 10 A diagram showing a $t_1$-second resistance used as a deterioration index of the secondary battery.

A constant current, current I is flown into the secondary battery for an arbitrary time ($t=t_1[s]$) from a stop state ($t=0[s]$). The voltage of $t=0$ is set to $V_0$ and the voltage of $t=t_1$ is set to $V_1$. As shown in FIG. 10, when the above-mentioned measurement is performed with various currents I and plotting a graph where the vertical axis is $|V_1-V_0|$ and the horizontal axis is the current I is performed, a tilt of a regression line is the $t_1$-second resistance ($Rt_1$).

Modified Example 4

In the above-mentioned embodiment, the table showing the correspondence between the combination of the temperature of the secondary battery with the internal resistance and the charging condition is used as a charging condition table. However, a table of a correspondence between the temperature or the internal resistance and the charging condition may be adopted. Alternatively, a table showing a correspondence between one or more kinds of parameters and a charging condition may be used.

Note that, the present technology may also take the following configurations.

(1) A power storage system, including:

a parameter detector that detects a parameter of a secondary battery;

a table storage unit that stores a table indicating a correspondence between a parameter of the secondary battery and a charging condition; and a charging control unit configured to refer to, based on the detected parameter, a corresponding charging condition from the table and make control to charge the secondary battery in this charging condition.

(2) The power storage system according to (1), in which the table is a table showing a correspondence between a combination of the temperature of the secondary battery with an internal resistance and a charging condition, and the parameter detector is configured detect the temperature of the secondary battery and the Internal resistance.

(3) The power storage system according to (1) or (2), in which the charging condition is defined to ensure a predetermined use period of the secondary battery.

(4) The power storage system according to any one of (1) to (3), in which the charging control unit is configured to refer to the corresponding charging condition from the table and perform charging in this charging condition if the detected temperature is lower than a predetermined temperature, and to perform charging in a fixed charging condition if the detected temperature is equal to or higher than the predetermined temperature.

(5) The power storage system according to any one of (1) to (4), further including:

an amount-of-deterioration calculator that calculates an amount of deterioration of the secondary battery; and an allowable amount-of-deterioration calculator that calculates an allowable amount of deterioration of the secondary battery, in which the charging control unit is configured to compare the calculated amount of deterioration with the calculated allowable amount of deterioration and to update the charging condition of the table such that the deterioration speed of the secondary battery is suppressed according to a result thereof.

(6) The power storage system according to (5), in which the amount-of-deterioration calculator and the allowable amount-of-deterioration calculator calculate the amount of deterioration and the allowable amount of deterioration, respectively, according to a predetermined timing condition, and the charging control unit is configured to update, if a change value of the amount of deterioration that is next acquired with respect to the amount of deterioration at a point of time at which the charging condition of the table was updated is larger than a change value of the allowable amount of deterioration that is next acquired with respect to the allowable amount of deterioration at the point of time at which the charging condition of the table was updated, the charging condition of the table such that a deterioration speed of the secondary battery is reduced.

DESCRIPTION OF REFERENCE NUMERALS 1 secondary battery module
2 charging control apparatus
3 charging unit
10 deterioration parameter detector
11 current monitoring unit
12 voltage monitoring unit
13 time monitoring unit
14 temperature monitoring unit
21 use history storage unit
22 deterioration index calculator
23 allowable deterioration index calculator
24 resistance calculator
25 charging condition table storage unit
26 charging control unit
100 power storage system

The invention claimed is:

1. A power storage system, comprising:
a parameter detector that detects a parameter of a secondary battery;
a table storage unit that stores a table indicating a correspondence between a combination of the parameter of the secondary battery and a set of first charging conditions; and
a charging control unit configured to:
determine a temperature range of the secondary battery, and refer to the table using the temperature range and the parameter at a same time to obtain a corresponding charging condition from the table and control charging the secondary battery in the corresponding charging condition,
wherein the temperature range, the parameter, and the corresponding charging condition are defined to ensure a predetermined use period of the secondary battery;
further comprising:
an amount-of-deterioration calculator that calculates an amount of deterioration of the secondary battery; and
an allowable amount-of-deterioration calculator that calculates an allowable amount of deterioration of the secondary battery; wherein the charging control unit is configured to compare the calculated amount of deterioration with the calculated allowable amount of deterioration and to update the corresponding charging condition of the table such that a deterioration speed of the secondary battery is suppressed according to a result thereof,
wherein the amount-of-deterioration calculator and the allowable amount-of-deterioration calculator calculate the amount of deterioration and the allowable amount of deterioration, respectively, according to a predetermined timing condition; and the charging control unit is configured to update, if a change value of the amount of deterioration that is next acquired with respect to the amount of deterioration at a point of time at which the corresponding charging condition of the table was updated is larger than a change value of the allowable amount of deterioration that is next acquired with respect to the allowable amount of deterioration at the point of time at which the corresponding charging condition of the table was updated, wherein the corresponding charging condition of the table is such that the deterioration speed of the secondary battery is reduced.

2. The power storage system according to claim 1, wherein charging by the charging control unit is controlled in the corresponding charging condition if a temperature of the secondary battery is lower than a predetermined temperature, and the charging is controlled in a fixed charging condition if the temperature of the secondary battery is equal to or higher than the predetermined temperature.

3. The power storage system according to claim 1, wherein the parameter is an internal resistance of the secondary battery.

4. A charging method for a secondary battery, comprising:
detecting a parameter of the secondary battery;
determining a temperature range of the secondary battery, and referring to a corresponding charging condition from a table using the temperature range and the parameter at a same time to obtain a corresponding charging condition from the table; and
controlling charging of the secondary battery in the corresponding charging condition,
wherein the temperature range, the parameter, and the corresponding charging condition are defined to ensure a predetermined use period of the secondary battery;
further comprising:
calculating, by an amount-of-deterioration calculator, an amount of deterioration of the secondary battery; and
calculating, by the allowable amount-of-deterioration calculator, an allowable amount of deterioration of the secondary battery; wherein a charging control unit is configured to compare the calculated amount of deterioration with the calculated allowable amount of deterioration and to update the corresponding charging condition of the table such that a deterioration speed of the secondary battery is suppressed according to a result thereof, and
calculating, by the amount-of-deterioration calculator and the allowable amount-of-deterioration calculator, the amount of deterioration and the allowable amount of deterioration, respectively, according to a predetermined timing condition;
wherein the charging control unit is configured to update, if a change value of the amount of deterioration that is next acquired with respect to the amount of deterioration at a point of time at which the corresponding charging condition of the table was updated is larger than a change value of the allowable amount of deterioration that is next acquired with respect to the allowable amount of deterioration at the point of time at which the corresponding charging condition of the table was updated, wherein the corresponding charging condition of the table is such that a deterioration speed of the secondary battery is reduced.

5. The charging method according to claim 4, wherein charging by the charging control unit is controlled based on a comparison of a temperature of the secondary battery with a predetermined temperature.

6. The charging method according to claim 5, wherein the predetermined temperature corresponds to a room temperature.

7. The charging method according to claim 4, wherein the corresponding charging condition varies within the table.

8. The charging method according to claim 4, wherein the parameter is an internal resistance of the secondary battery.

9. A power storage system, comprising:
- a parameter detector that detects a parameter of a secondary battery;
- a table storage unit that stores a table indicating a correspondence between a combination of the parameter of the secondary battery and a set of first charging conditions;
- an allowable amount-of-deterioration calculator that calculates an allowable amount of deterioration according to a predetermined timing condition; and
- a charging control unit configured to:
- update the table based on the allowable amount of deterioration,
- determine a temperature range of the secondary battery, and refer to the table using the temperature range and the parameter at a same time to obtain a corresponding charging condition from the table and control charging the secondary battery in the corresponding charging condition,
- wherein the temperature range, the parameter, and the corresponding charging condition are defined to ensure a predetermined use period of the secondary battery;

further comprising:
- an amount-of-deterioration calculator that calculates an amount of deterioration of the secondary battery; and
- the allowable amount-of-deterioration calculator that calculates an allowable amount of deterioration of the secondary battery; wherein the charging control unit is configured to compare the calculated amount of deterioration with the calculated allowable amount of deterioration and to update the corresponding charging condition of the table such that a deterioration speed of the secondary battery is suppressed according to a result thereof, wherein the amount-of-deterioration calculator and the allowable amount-of-deterioration calculator calculate the amount of deterioration and the allowable amount of deterioration, respectively, according to the predetermined timing condition; and the charging control unit is configured to update, if a change value of the amount of deterioration that is next acquired with respect to the amount of deterioration at a point of time at which the corresponding charging condition of the table was updated is larger than a change value of the allowable amount of deterioration that is next acquired with respect to the allowable amount of deterioration at the point of time at which the corresponding charging condition of the table was updated, wherein the corresponding charging condition of the table is such that the deterioration speed of the secondary battery is reduced.

* * * * *